United States Patent
Strock

(10) Patent No.: US 8,936,432 B2
(45) Date of Patent: Jan. 20, 2015

(54) LOW DENSITY ABRADABLE COATING WITH FINE POROSITY

(75) Inventor: Christopher W. Strock, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 878 days.

(21) Appl. No.: 12/910,982

(22) Filed: Oct. 25, 2010

(65) Prior Publication Data

US 2012/0099973 A1 Apr. 26, 2012

(51) Int. Cl.
| | |
|---|---|
| F01D 5/20 | (2006.01) |
| F01D 11/08 | (2006.01) |
| F04D 29/08 | (2006.01) |
| C23C 4/02 | (2006.01) |
| C23C 4/18 | (2006.01) |
| C23C 24/00 | (2006.01) |
| C23C 28/02 | (2006.01) |

(52) U.S. Cl.
CPC ... C23C 4/02 (2013.01); C23C 4/18 (2013.01); C23C 24/00 (2013.01); C23C 28/021 (2013.01); C23C 28/022 (2013.01); C23C 28/027 (2013.01)
USPC ........................ 415/173.4; 415/174.4; 416/174

(58) Field of Classification Search
USPC .................. 415/173.4, 174.4, 173.1; 416/174
See application file for complete search history.

(56) References Cited

U.S. PATENT DOCUMENTS

| | | | |
|---|---|---|---|
| 4,227,703 A | 10/1980 | Stalker et al. | |
| 4,238,170 A | 12/1980 | Robideau et al. | |
| 4,336,276 A | 6/1982 | Bill et al. | |
| 4,588,607 A | 5/1986 | Matarese et al. | |
| 4,783,341 A | 11/1988 | Packer et al. | |
| 4,861,618 A | 8/1989 | Vine et al. | |
| 4,884,820 A | 12/1989 | Jackson et al. | |
| 4,936,745 A | 6/1990 | Vine et al. | |
| 5,013,605 A * | 5/1991 | Gritz et al. | ..................... 428/410 |
| 5,113,582 A | 5/1992 | Monson et al. | |
| 5,188,643 A * | 2/1993 | Iacovangelo | ..................... 51/293 |
| 5,434,210 A | 7/1995 | Rangaswamy et al. | |
| 5,536,022 A | 7/1996 | Sileo et al. | |
| 5,562,404 A | 10/1996 | Koff et al. | |
| 5,645,399 A | 7/1997 | Angus | |
| 5,705,231 A | 1/1998 | Nissley et al. | |
| 5,715,596 A | 2/1998 | Bintz | |
| 5,780,116 A | 7/1998 | Sileo et al. | |

(Continued)

FOREIGN PATENT DOCUMENTS

| | | |
|---|---|---|
| EP | 2088224 A1 | 8/2009 |
| EP | 2088224 A1 | 8/2009 |

(Continued)

OTHER PUBLICATIONS

European Search Report, mailed Jan. 18, 2012.

(Continued)

*Primary Examiner* — Edward Look
*Assistant Examiner* — Christopher J Hargitt
(74) *Attorney, Agent, or Firm* — Kinney & Lange P.C.

(57) ABSTRACT

A low density abradable coating for use as a seal material is formed by depositing a metal bond coat followed by depositing a low density, porous, abradable metal seal layer on the bond coat. The seal layer is formed by co-depositing metallic sponge particles and metal precursor particles. The metal precursor particles decompose during heat treatment leaving fine pores distributed throughout the microstructure.

18 Claims, 4 Drawing Sheets

(56) References Cited

U.S. PATENT DOCUMENTS

| | | | |
|---|---|---|---|
| 5,780,171 | A | 7/1998 | Nissley et al. |
| 5,879,753 | A | 3/1999 | Zajchowski et al. |
| 5,950,308 | A | 9/1999 | Koff et al. |
| 6,089,825 | A | 7/2000 | Walden et al. |
| 6,102,656 | A | 8/2000 | Nissley et al. |
| 6,177,174 | B1 | 1/2001 | Legrand |
| 6,190,124 | B1 | 2/2001 | Freling et al. |
| 6,358,002 | B1 * | 3/2002 | Good et al. ............... 415/174.4 |
| 6,383,658 | B1 | 5/2002 | Carlson et al. |
| 6,537,021 | B2 | 3/2003 | Howard et al. |
| 6,703,137 | B2 | 3/2004 | Subramanian |
| 7,407,369 | B2 | 8/2008 | Schwarz et al. |
| 7,510,370 | B2 | 3/2009 | Strangman et al. |
| 7,998,604 | B2 * | 8/2011 | Reynolds et al. ............ 428/701 |
| 2004/0005452 | A1 | 1/2004 | Dorfman et al. |
| 2004/0137259 | A1 | 7/2004 | Pabla et al. |
| 2006/0140756 | A1 | 6/2006 | Schwarz et al. |
| 2008/0063520 | A1 | 3/2008 | Baumann et al. |
| 2008/0087023 | A1 | 4/2008 | Suciu et al. |
| 2008/0219835 | A1 | 9/2008 | Freling et al. |
| 2008/0226879 | A1 | 9/2008 | Strock |
| 2009/0017260 | A1 | 1/2009 | Kulkarni et al. |
| 2009/0097970 | A1 | 4/2009 | Tholen et al. |
| 2009/0136740 | A1 | 5/2009 | Reynolds et al. |
| 2010/0098923 | A1 | 4/2010 | Freling et al. |
| 2010/0143103 | A1 | 6/2010 | Sellars et al. |

FOREIGN PATENT DOCUMENTS

| | | |
|---|---|---|
| WO | W02011141017 A2 | 11/2011 |
| WO | WO 2011/041017 A2 | 11/2011 |

OTHER PUBLICATIONS

European Search Report, mailed Jan. 19, 2012.

Article entitled "On the Potential of Metal and Ceramic Based Abradables in Turbine Seal Applications", Proceedings of the Thirty-Sixth Turbomachinery Symposium—2007, Dieter Sporer et al., pp. 79-86.

Article entitled "Increased Efficiency of Gas Turbines", New High-Temperature Seal System, Sulzer Technical Review Feb. 2008, Dieter Sporer et al., pp. 1-4.

* cited by examiner

LOW DENSITY ABRADABLE COATING WITH FINE POROSITY

CROSS-REFERENCE TO RELATED APPLICATION(S)

This application is related to the following co-pending applications that are filed on even date herewith and are assigned to the same assignee: ABRASIVE ROTOR COATING FOR FORMING A SEAL IN A GAS TURBINE ENGINE, Ser. No. 12/910,989; ROUGH DENSE CERAMIC SEALING SURFACE IN TURBOMACHINES, Ser. No. 12/910,973; THERMAL SPRAY COATING PROCESS FOR COMPRESSOR SHAFTS, Ser. No. 12/910,994; FRIABLE CERAMIC ROTOR SHAFT ABRASIVE COATING, Ser. No. 12/910,966; ABRASIVE ROTOR SHAFT CERAMIC COATING, Ser. No. 12/910,960; ABRASIVE CUTTER FORMED BY THERMAL SPRAY AND POST TREATMENT, Ser. No. 12/911,004; and SELF DRESSING, MILDLY ABRASIVE COATING FOR CLEARANCE CONTROL, Ser. No. 12/910,954. The disclosures of these applications are incorporated herein by reference in their entirety.

BACKGROUND

Gas turbine engines include compressor rotors having a plurality of rotating compressor blades. Minimizing the leakage of air, such as between tips of rotating blades and a casing of the gas turbine engine, increases the efficiency of the gas turbine engine because the leakage of air over the tips of the blades can cause aerodynamic efficiency losses. To minimize this, the gap at tips of the blades is set small and at certain conditions, the blade tips may rub against and engage an abradable seal at the casing of the gas turbine. The abradability of the seal material prevents damage to the blades while the seal material itself wears to generate an optimized mating surface and thus reduce the leakage of air.

Abradable seals have also been used in turbines to reduce the gap between a rotor and a vane. Thermally sprayed abradable seals have been used in gas turbine engines since the late 1960s. The seals have been made as coatings from porous and composite materials that derive their abradability from the use of low shear strength materials or from a porous, friable coating.

Prior art porous metal seals are commonly produced by thermally co-depositing metal seal particles and fugitive polymer particles. Heat treating the seal coating following deposition causes the polymer particles to decompose leaving a porous microstructure. The decomposition products vent through interconnected porosity during the heat treatment resulting in a lower density abradable seal coating. The gaseous permeability of prior art porous seal coatings can contribute to leakage bypassing the air foils and reducing engine efficiency.

SUMMARY

The present invention comprises a method for forming a low density porous metal coating for use as a seal material on components of gas turbine engines. The coating is formed by depositing a low density porous abradable metal seal layer on the component. The seal layer is formed by co-depositing metallic sponge particles and metal precursor particles that decompose during post-deposition heat treatment to leave fine pores with metal walls. The metal precursor particles can be infiltrated in the sponge particles to minimize pore size and spacing. The metal decomposition product following heat treatment strengthens the porous structure by reinforcing interparticle bonding and improving erosion resistance of the seal. The low density seal material can be effectively cut by bare metal blade tips during a rub interaction.

DETAILED DESCRIPTION

Figure 1:
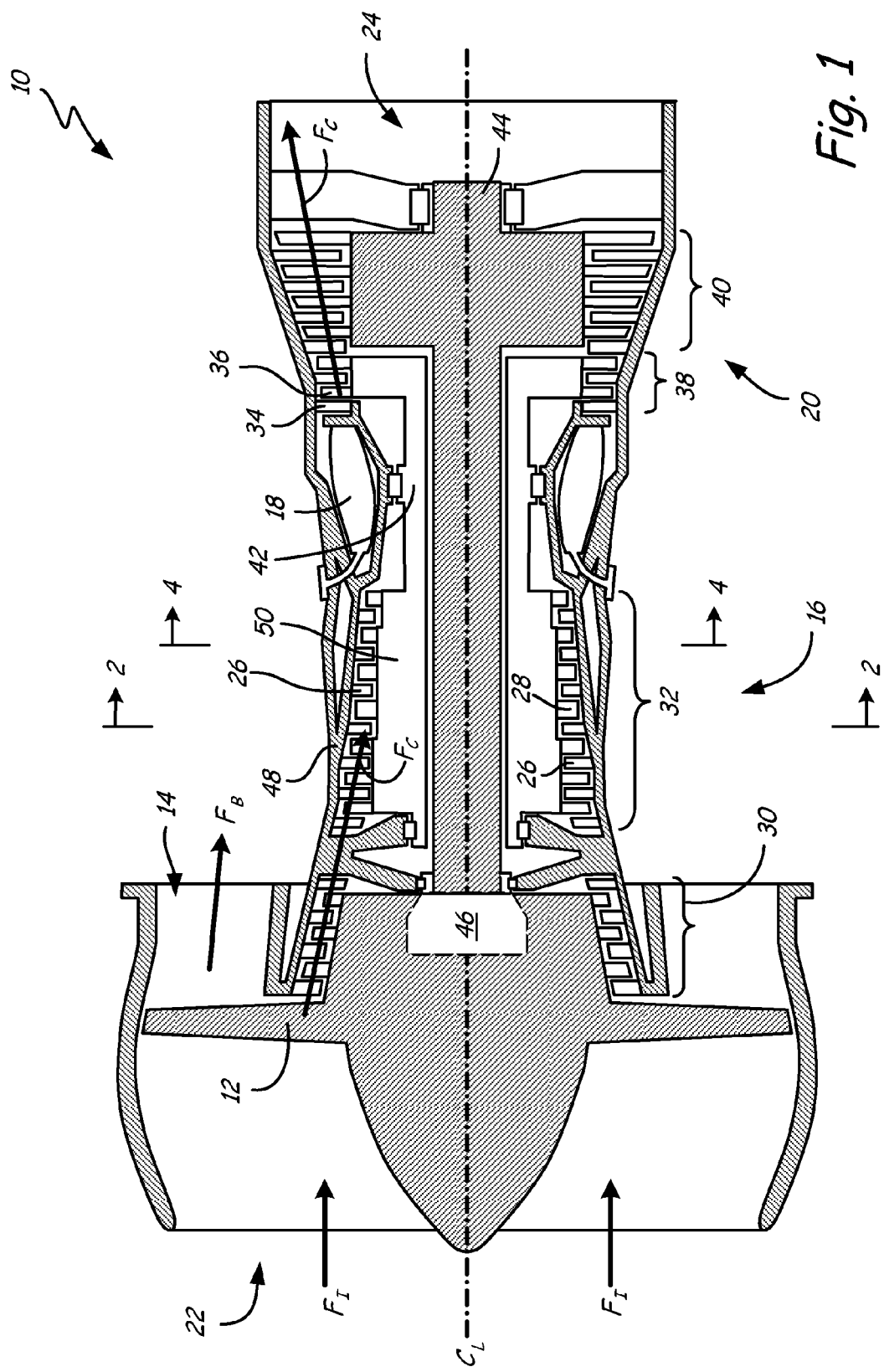
FIG. 1 illustrates a simplified cross-sectional view of a gas turbine engine.

FIG. 1 is a cross-sectional view of gas turbine engine 10, in a turbofan embodiment. As shown in FIG. 1, turbine engine 10 comprises fan 12 positioned in bypass duct 14, with bypass duct 14 oriented about a turbine core comprising compressor (compressor section) 16, combustor (or combustors) 18 and turbine (turbine section) 20, arranged in flow series with upstream inlet 22 and downstream exhaust 24.

Compressor 16 comprises stages of compressor vanes 26 and blades 28 arranged in low pressure compressor (LPC) section 30 and high pressure compressor (LPC) section 32. Turbine 20 comprises stages of turbine vanes 34 and turbine blades 36 arranged in high pressure turbine (HPT) section 38 and low pressure turbine (LPT) section 40. HPT section 38 is coupled to HPC section 32 via HPT shaft 32, forming the high pressure spool or high spool. LPT section 40 is coupled to LPC section 30 and fan 12 via LPT shaft 44, forming the low pressure spool or low spool. HPT shaft 42 and LPT shaft 44 are typically coaxially mounted, with the high and low spools independently rotating about turbine axis (centerline) $C_L$.

Fan 12 comprises a number of fan airfoils circumferentially arranged around a fan disk or other rotating member, which is coupled (directly or indirectly to LPC section 30 and driven by LPT shaft 44. In some embodiments, fan 12 is coupled to the fan spool via geared fan drive mechanism 46, providing independent fan speed control.

As shown in FIG. 1, fan 12 is forward-mounted and provides thrust by accelerating flow downstream through bypass duct 14, for example in a high-bypass configuration suitable for commercial and regional jet aircraft operations. Alternatively, fan 12 is an unducted fan or propeller assembly, in either a forward or aft-mounted configuration. In these various embodiments turbine engine 10 comprises any of a high-bypass turbofan, a low-bypass turbofan or a turboprop engine, and the number of spools and the shaft configurations may vary.

In operation of turbine engine 10, incoming airflow $F_I$ enters inlet 22 and divides into core flow $F_C$ and bypass flow $F_B$, downstream of fan 12. Core flow $F_C$ propagates along the core flowpath through compressor section 16, combustor 18 and turbine section 20, and bypass flow $F_B$ propagates along the bypass flowpath through bypass duct 14.

LPC section 30 and HPC section 32 of compressor 16 are utilized to compress incoming air for combustor 18, where fuel is introduced, mixed with air and ignited to produce hot combustion gas. Depending on embodiment, fan 12 also provides some degree of compression (or pre-compression) to core flow FC, and LPC section 30 (or a portion of it) may be omitted. Alternatively, an additional intermediate spool is included, for example in a three-spool turboprop or turbofan configuration.

Combustion gas exits combustor 18 and enters HPT section 38 of turbine 20, encountering turbine vanes 34 and turbine blades 36. Turbine vanes 34 turn and accelerate the flow, and turbine blades 36 generate lift for conversion to rotational energy via HPT shaft 42, driving HPC section 32 of compressor 16 via HPT shaft 42. Partially expanded combustion gas transitions from HPT section 38 to LPT section 40, driving LPC section 30 and fan 12 via LPT shaft 44. Exhaust flow exits LPT section 40 and turbine engine 10 via exhaust nozzle 24.

The thermodynamic efficiency of turbine engine 10 is tied to the overall pressure ratio, as defined between the delivery pressure at inlet 22 and the compressed air pressure entering combustor 18 from compressor section 16. In general, a higher pressure ratio offers increased efficiency and improved performance, including greater specific thrust. High pressure ratios also result in increased peak gas path temperatures, higher core pressure and greater flow rates, increasing thermal and mechanical stress on engine components.

Figure 2:
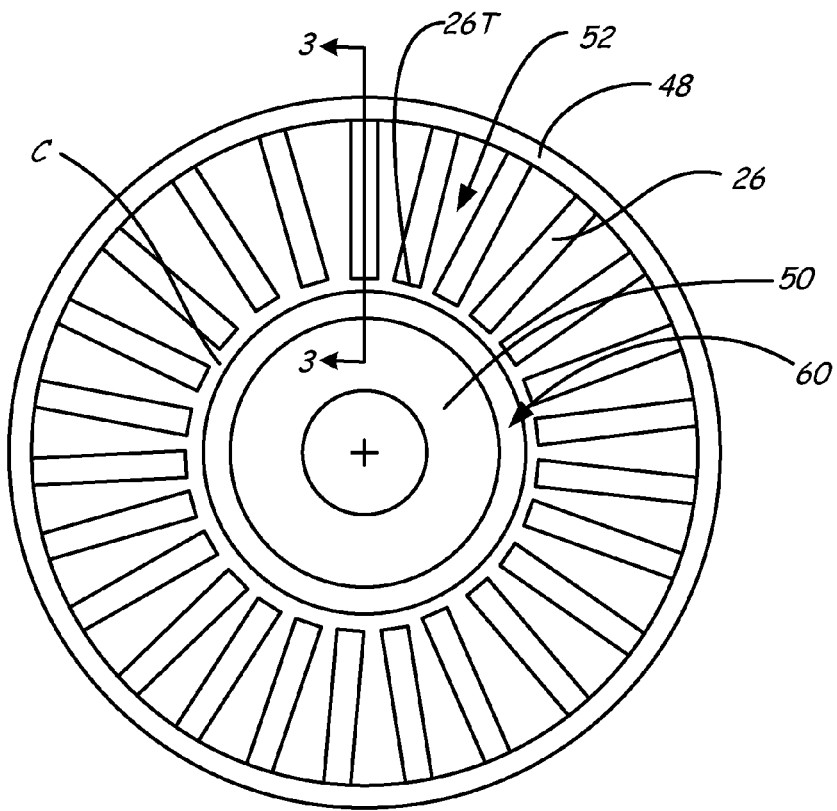
FIG. 2 illustrates a simplified cross-sectional view illustrating the relationship of the rotor and vanes taken along the line 2-2 of FIG. 1, not to scale.
Figure 3:
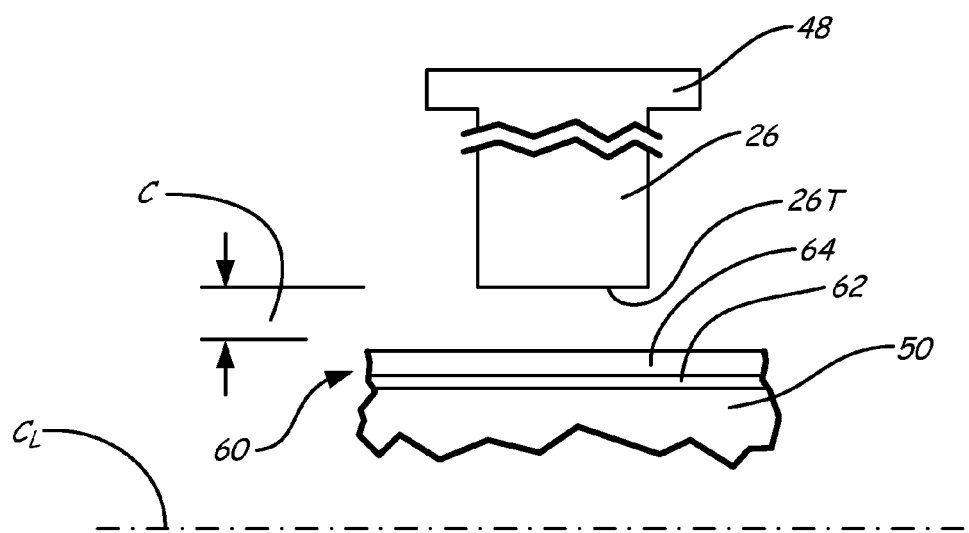
FIG. 3 is a cross-sectional view taken along the line 3-3 of FIG. 2, not to scale.
Figure 4:
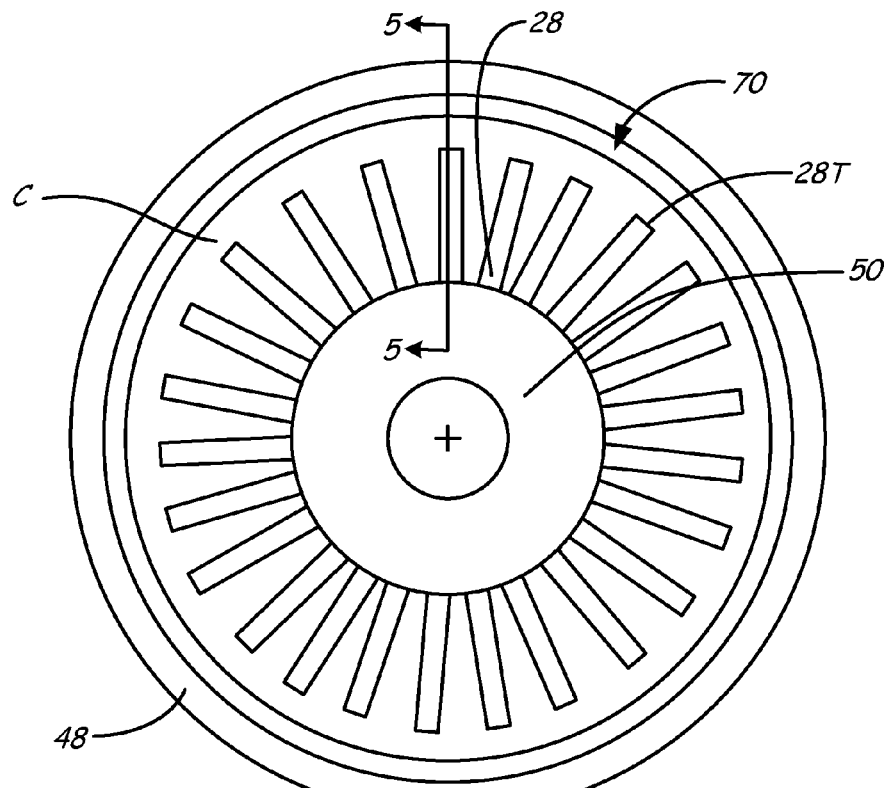
FIG. 4 illustrates a simplified cross-sectional view illustrating the relationship of the casing or shroud and blades taken along the line 4-4 of FIG. 1, not to scale.
Figure 5:
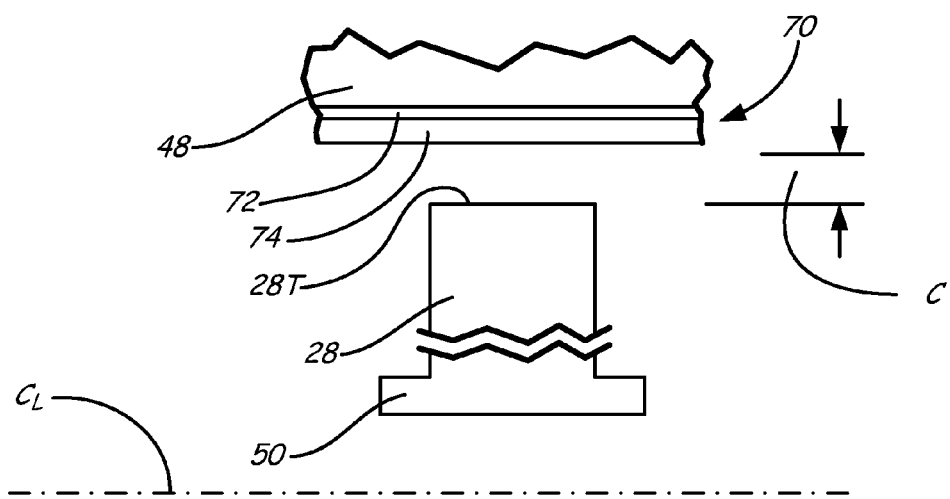
FIG. 5 is a cross-sectional view taken along the line 5-5 of FIG. 4, not to scale.

The present invention is intended to be used with airfoils in turbine engines. The term "airfoil" is intended to cover both rotor blades and stator vanes. It is the purpose of this invention to produce porous metal seals with equivalent density to prior art seals with interconnected porosity, but with pore sizes an order of magnitude smaller than current seals to limit permeability and increase engine efficiency to acceptable values. FIG. 2 and FIG. 3 disclose the invention with respect to interaction of a stator vane with a rotor. FIG. 4 and FIG. 5 disclose the invention with respect to interaction of a rotor blade with a stator casing or shroud. The coating of this invention may be used with either or both configurations.

FIG. 2 is a cross section along line 22 of FIG. 1 of a casing 48 which has a rotor shaft 50 inside. Vanes 26 are attached to casing 48 and the gas path 52 is shown as the space between vanes 26. Coating 60, is on rotor shaft 50 such that the clearance C between coating 60 and vane tips 26T of vanes 26 has the proper tolerance for operation of the engine, e.g., to serve as a seal to prevent leakage of air (thus reducing efficiency), while not interfering with relative movement of the vanes and rotor shaft. In FIGS. 2 and 3, clearance C is expanded for purposes of illustration. In practice, clearance C may be, for example, in a range of about 25 to 55 mils (635 to 1397 microns) when the engine is cold and 0.000 to 0.035 during engine operation depending on the specific operating condition and previous rub events that may have occurred.

FIG. 3 shows the cross section along line 3-3 of FIG. 2, with casing 48 and vane 26. Coating 60 is attached to rotor shaft 50, with a clearance C between coating 60 and vane tip 26T of vane 26 that varies with operating conditions, as described herein.

FIG. 3 shows bi-layer coating 60 which includes metallic bond coat 62 and abradable layer 64. Metallic bond coat 62 is applied to rotor shaft 50. Abradable layer 64 is deposited on top of bond coat 62 and is the layer that first encounters vane tip 26T.

As can be seen from FIG. 4 and FIG. 5, the same concept is used in which coating 70 is provided on the inner diameter surface of casing or shroud 48. Coating 70 includes a first metallic bond coat 72 that has been applied to the ID of stator casing 48. In other embodiments, stator casing 48 includes a shroud that forms a blade air seal. Abradable layer 74 is formed on bond coat 72 and is the layer that first encounters rotor tip 28T.

In other embodiments, abradable layers 64 and 74 may be directly applied to rotor shaft 50 and casing 48 respectively without intermediate bond coats 62 and 72.

One form of prior art abradable seals is a porous metal layer. The presence of pores lowers the shear strength of the layer such that material is easily removed in the event of rubbing contact with an airfoil. A standard method of forming porous seal coatings is by the co-deposition of metal particles and particles of a fugitive material such as Lucite. Heat treatment following deposition decomposes the fugitive filler and the reaction products escape through interconnected porosity to form a porous metal coating. An example of a prior art porous coating is described in commonly owned U.S. Pat. No. 4,696,855 and is incorporated by reference in its entirety. The pores of the prior art coating are about 45 to 150 microns (1.8 to 5.9 mils) in diameter. In comparison with the prior art, the pores of the inventive coating material discussed herein are about 7 times smaller with about equivalent volume percentages of porosity.

Bond coats 62 and 72 are thin, up to 254 microns (10 mils), more specifically ranging from about 76 microns to about 178 microns (3 to 7 mils). Abradable coatings 62 and 72 can be about the same thickness as bond coats 62 and 72, again ranging from about 76 mils to about 178 microns (3 to 7 mils).

Bond coats 62 and 72 are a nickel aluminum alloy or may be formed of MCrAl or MCrAlY, where the metal (M) can be nickel (Ni), iron (Fe), or cobalt (Co), or combinations thereof and the alloying elements are chromium (Cr), aluminum (Al) and yttrium (Y) and/or other active element(s). For example, bond coats 62 and 72 may be 15-40% CR 6-15% Al, 0.61 to 1.0% Y and the balance is cobalt, nickel or iron and combinations thereof.

Abradable layer 64 and 74 may be a porous metallic layer with ultra fine interconnected pores as described herein. The pore size ranges from 2 to 25 microns (0.08 to 0.98 mils), more preferably 3 to 15 microns (0.12 to 0.59 mils). The pore density of abradable layer 64 and 74 is 40 to 80 volume percent, more preferably 55 to 60 volume percent.

Figure 6:
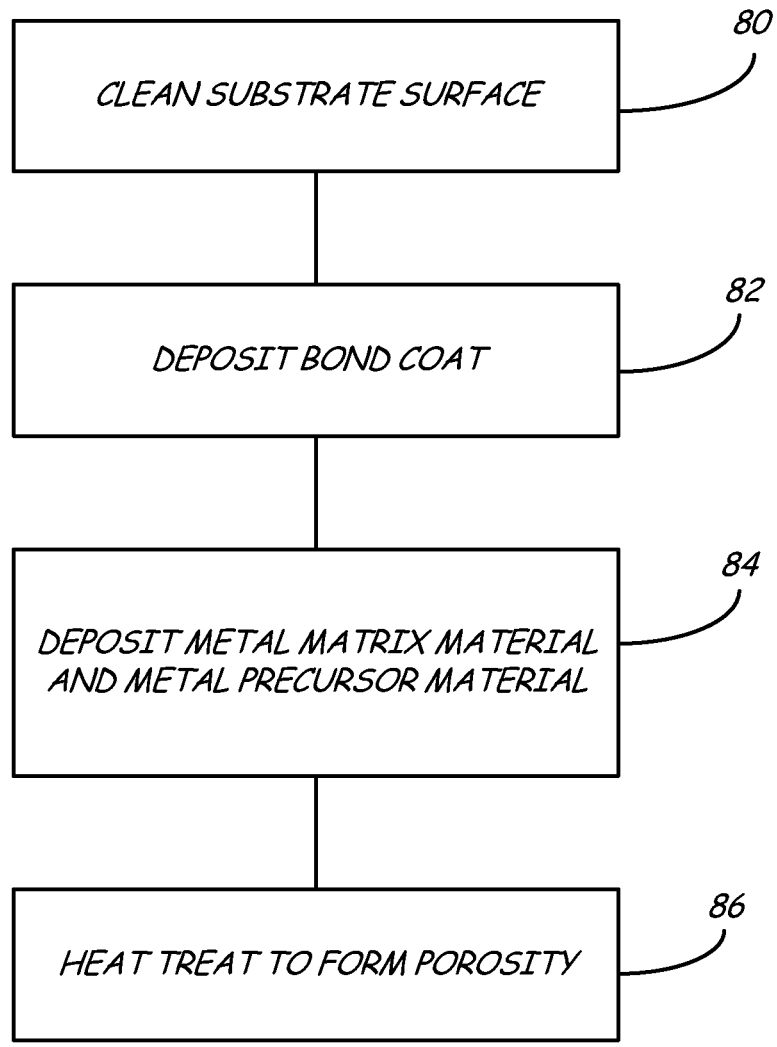
FIG. 6 is a method to produce an abradable seal material with fine pore sizes.

Abradable layer 64 may be formed from the above mentioned bond coat alloys or from the following; titanium aluminide, nickel aluminide, aluminum and its alloys including aluminum silicon eutectic alloy, copper and its alloys including bronzes, brasses and cupronickel alloys A method of forming the low density abradable coating of the instant invention is shown in FIG. 6. The first step in the process is to clean and otherwise prepare the substrate surface (Step 80). Conventional cleaning and preparation is by methods known to those in the art of thermal and high velocity coating deposition. Processes such as mechanical abrasion through vapor or air blast processes using dry or liquid carried abrasive particles impacting the surface are standard.

The next step is to deposit an optional bond coat (Step 82). Bond coat deposition can be by, among others, thermal spraying including wire arc, combustion wire, high velocity oxy fuel (HVOF), plasma spray and cold spray deposition wherein solid particles are deposited using the kinetic energy of particles to induce bonding of particles with a surface upon impact. The starting material may be in the form of wire with a typical diameter of 813 to 3175 microns (32 to 125 mils) or powder with typical particle sizes ranging from 10 to 75 microns (0.4 to 3 mils).

Deposition of the low density abradable metal matrix coating of the invention is included in step 84. Deposition is carried out using the same techniques as those used for bond coat deposition described above. There are two components of the deposition process. The first component is the material that forms the metal matrix. In order to generate a matrix containing a dispersion of closely spaced pores in the 2 to 25 micron (0.08 to 1 mil) size range, it is advantageous to use powders formed of alloy sponge. The porous microstructure of the sponge will naturally form a coating containing a high density of small pores. The alloys used to form the metal matrix may be the same alloys used to form the bond coat.

The second component of the deposition process is a metal precursor material. The metal precursor material, in powder form, is distributed throughout the metal matrix coating through co-deposition. Heat treatment following deposition causes the metal precursor particles to decompose leaving pores with metal walls while the decomposition products escape through the interconnected porosity of the metal matrix coating. Examples of metal precursor materials used in this invention include nickel acetate, nickel sulfate, nickel phosphate, nickel carbonate, nickel bicarbonate, and nickel hydrides, such as nickel oxy hydride.

Spray dried composite powder containing alloy sponge powder and metal precursor powder can conveniently be utilized as feed stock for thermal spraying the low density abradable coating of the instant invention. The feed stock powder is formed by spray drying an aqueous slurry comprising the two powders, an organic binder, and a dispersing agent to produce uniform particle suspension in the slurry. The slurry is atomized and spray dried using conventional techniques known in the art to form thermal spray feed stock in the form of spherical powders. Formation of spray dried composite feed stock powder of the invention is taught by Dorfman et al., U.S. Patent Application 2006/0193993 and incorporated herein in its entirety as reference.

An alternate method of adding metal precursors to the starting material for deposition is to use powder formed from alloy sponge that has been chemically infiltrated with metal precursor.

Following deposition of the metal matrix and metal precursor materials the coating is heat treated (Step 86). As mentioned, this decomposes the metal precursor regions in the coating, leaving fine pores coated with, in this case, nickel distributed throughout the structure. During heat treatment, the fugitive decomposition products escape through the interconnecting porosity in the coating. The metal remaining from the decomposition of the metal precursor, further strengthens the structure by reinforcing interparticle bonding while maintaining low density resulting from the high volume percent of fine pores.

The heat treatments used in the current invention comprise steps of dehydration and decomposition of the precursor and sintering of the Ni reduction product. Many of the suitable precursors such as nickel acetate are most stable and exist in the hydrated state. In this case, as nickel acetate tetrahydrate. In this example, a part coated with porous Ni alloy containing nickel acetate tetrahydrate within its pores is heat treated by placing the part into a furnace with a protective non-oxidizing atmosphere, in this case cracked ammonia, increasing the part temperature to 110° C. (230° F.) at 5° C. (41° F.) per minute, heating the part from 110° to 140° C. (230° to 284° F.) at a rate of 0.5° C./minute (33° F./minute) to allow escape of the water vapor during conversion to anhydrous nickel acetate, increasing temperature to 335° C. (635° F.) at 5° C. (41° F.) per minute, then slowing the ramp rate to 0.5° C. (33° F.) per minute for heating from 335° to 565° C. (635° to 1049° F.) over which range decomposition of the acetate takes place. The part may then be further heated at 5° C. (41° F.) per minute to a sintering temperature of 700° C. (1292° F.) at which the part is held for two hours and then furnace cooled to 200° C. (392° F.) before ventilating the furnace and air cooling to room temperature.

During the sintering heat treatment, the fine Ni reduction product may be densified to increase the strength of the coating. The conversion products are initially nano-scale particles. These fine particles sinter readily at a temperature as low as 650° C. (1202° F.), and at a much higher rate than the larger particles and pores of the Ni matrix material.

The inventive seal material containing high volume percent of 2 to 25 micron (0.08 to 1 mil) diameter pores discussed herein is not limited to coatings. Rather, it also can be used in bulk forms as a sintered product formed by pressing, injection molding, tape casting, and others.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a low density abradable metal coating on a turbo machine structure comprising:
   thermal spraying particles consisting of metallic sponge particles with fine pore size and metal precursor compound particles on the structure to form a metal matrix; and
   heat treating the structure to form a porous metal coating on the structure.

2. The method of claim 1, wherein metal bond coat particles are thermal sprayed on the structure before the metallic sponge particles and metal precursor compound particles are sprayed on the structure.

3. The method of claim 2, wherein the bond coat particles comprise a nickel aluminum alloy, MCrAl or MCrAlY wherein M is nickel, iron, cobalt, or alloys thereof.

4. The method of claim 1, wherein the metallic sponge particles comprise a nickel aluminum alloy, MCrAl or MCrAlY wherein M is nickel, iron, cobalt, or alloys thereof.

5. The method of claim 1, wherein the metal precursor compound particles comprise at least one of the hydrated or anhydrous forms of nickel acetate, nickel chloride, ammonium nickel sulfate, nickel sulfate, nickel phosphate, nickel carbonate, nickel bicarbonate, and nickel oxy hydride.

6. The method of claim 1, wherein heat treating the structure comprises heating the structure to 700° C. (1292° F.) for 2 hours in a cracked ammonia atmosphere.

7. The method of claim 1, wherein thermal spraying comprises plasma spraying, high velocity oxygen fuel (HVOF) spraying or cold spraying.

8. The method of claim 1, wherein a volume percent of pores in the porous coating ranges from 40% to 80%.

9. A low density porous abradable metal coating on a turbo machine structure formed by:
   thermal spraying metal bond coat particles on the structure;
   thermal spraying particles consisting of metallic sponge particles with fine pore size and metal precursor compound particles on the bond coat to form a metal matrix; and heat treating the structure to form a porous metal coating on the bond coat.

10. The low density coating of claim 9, wherein the bond coat particles comprise a nickel aluminum alloy, MCrAl or MCrAlY where M is nickel, iron, cobalt, or alloys thereof.

11. The low density coating of claim 9, wherein the metallic sponge particles comprise a nickel aluminum alloy, MCrAl or MCrAlY where M is nickel, iron, cobalt, or alloys thereof.

12. The low density coating of claim 9, wherein the metal precursor compound particles comprise at least one of nickel sulfate, nickel phosphate, nickel carbonate, nickel bicarbonate, and nickel oxy hydride.

13. The low density coating of claim 9, wherein heat treating the structure comprises heating the structure to 700° C. (1292° F.) for 2 hours in a cracked ammonia atmosphere.

14. The low density coating of claim 9, wherein thermal spraying comprises plasma spraying, high velocity oxygen fuel (HVOF) spraying or cold spraying.

15. The low density coating of claim 9, wherein a volume percent of pores in the porous coating ranges from 40% to 70%.

16. A seal for a gas turbine engine comprising a low density porous metal abradable coating on a surface in rotary proximity to a metal airfoil or housing wherein forming the abradable coating comprises:
    thermal spraying metal bond coat particles on the structure;
    thermal spraying particles consisting of metallic sponge particles with fine pore size and metal precursor compound particles on the bond coat to form a metal matrix; and
    heat treating the structure to form a porous metal coating on the bond coat.

17. The seal of claim 16, wherein the bond coat particles comprise a nickel aluminum alloy, MCrAl or MCrAlY wherein M is nickel, iron, cobalt, or alloys thereof.

18. The seal of claim 16, wherein the metallic sponge particles comprise a nickel aluminum alloy MCrAl or MCrAlY wherein M is nickel, iron, cobalt, or alloys thereof.

* * * * *